FIG. 1
FIG. 2
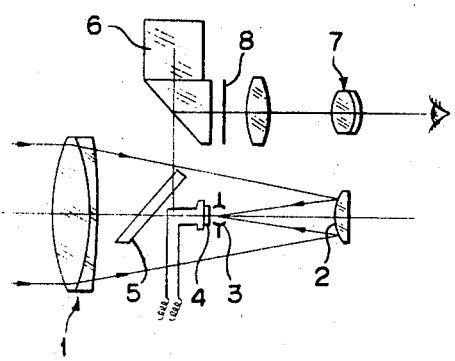
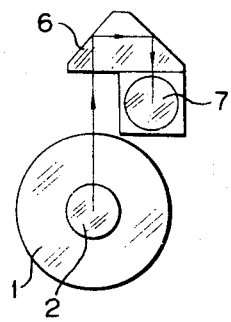
FIG. 3
FIG. 4
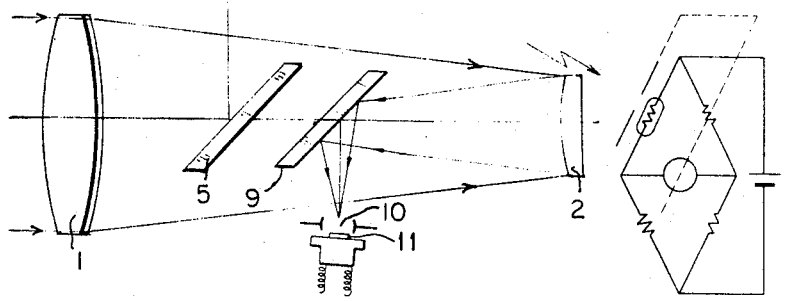
FIG. 5
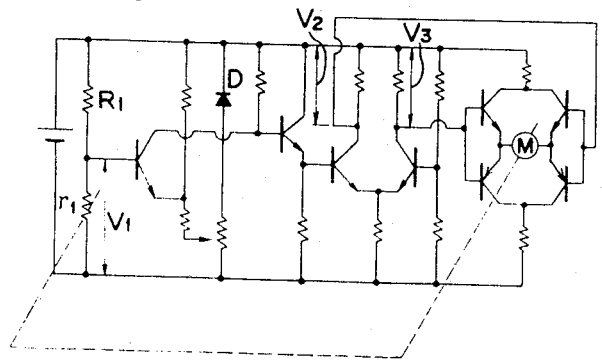

United States Patent Office 3,476,028
Patented Nov. 4, 1969

3,476,028
MONOCULAR NARROW ANGLE EXPOSURE METER
Yasuhiro Namba, Kazuo Kessoku, and Tadayoshi Fujii, Toyokawa, and Toshinobu Ogura, Sakai, and Ichiro Yoshiyama, Kobe, Japan, assignors to Minolta Camera Kabushiki Kaisha, Minami-ku, Osaka, Japan, a Japanese corporation
Filed Nov. 30, 1966, Ser. No. 597,909
Claims priority, application Japan, Mar. 8, 1966, 41/14,177, 41/20,963; June 21, 1966, 41/39,781
Int. Cl. G03b *19/12;* G01j *1/00, 1/52*
U.S. Cl. 95—42                         4 Claims

ABSTRACT OF THE DISCLOSURE

A monocular narrow angle exposure meter having a device for directing a central portion of incoming light rays from the objective lens to a finder optical system and a remaining peripheral portion to a light measuring optical system which is provided with a photo-electric element. A window restricts the light receiving angle in an image forming plane of the light measuring optical system, immediately ahead of the photo-electric element. A circuit detects the ratio of the resistance of the photo-electric element to that of a variable resistor and this ratio is maintained at a predetermined value by a motor which regulates the value of the resistance of the variable resistor, said variable resistor being mechanically connected with an indicator means.

---

This invention is related to a monocular narrow angle exposure meter, more particularly a monocular narrow angle exposure meter using a reflective optical system.

The optical system usable in the exposure meter of the invention comprises both a light measuring system of narrow reflective angle type and a finder system having a part of its optical axis in common with that of the light measuring system, whereby parallax in conventional exposure meters with respect to a photographic object is eliminated to ensure accurate measurement of the brightness of the object.

According to the present invention, the output from a bridge circuit is amplified to drive a motor so as to vary the resistance value of a variable resistor. When the ratio of the photoelectric element resistance $R_1$ to the variable resistor resistance $r_1$ reaches a predetermined value, the rotation of the motor is stopped to indicate the value in question by means of the angular position deviation of the variable resistor.

Among the conventional exposure meters there are meters having a bridge circuit. In these exposure meters, however, the galvanometer connected to the output of the bridge circuit controls the quantity of light into the photoelectric element through an iris diaphragm so that the angular deviation of the pointer of said galvanometer may indicate the determined value for exposure.

The present invention seeks to obviate such disadvantage by providing an improved monocular narrow angle exposure meter usable as an automatic exposure regulating device or an automatic indicating device having a high accuracy over a wide range of brightness of photographic objects, which exposure meter preferably has a switching member operable in snap action across a dead point and mountable on an exposure regulating member or indicating member, so that upon operation of the switching member one of two variable resistors is selectively connected to a motor circuit, and at the same time sensitivity of a photo-electric element is changed by switching over an incident ray limiting member.

The salient feature of the exposure meter according to the present invention are as follows.

The optical system of the exposure meter according to the present invention comprises a converging double focus optical element for bringing a central portion of light beams passing through an objective lens into a finder system and a peripheral portion thereof into a light measuring system. On the image forming plane (or conjugate plane) of the finder system there are provided a graduate scale and an indicator necessary for the exposure meter. There is provided in the light measuring system, a frame for limiting a visual field for light measuring (or light receiving angle) so that the photoelectric element located behind said frame may receive light of a considerably narrow angle of incidence to determine the brightness of the narrow portion of the photographic object.

The finder system comprises a Kepler type telescope having a wide view and producing a clear image of an object magnified by several times. Such finder system is particularly advantageous for a narrow angle exposure meter, because it is necessary to ascertain accurately a small photographic objective in such exposure meter.

The brightness measuring system comprises a transistor circuit, a motor and mechanical elements such as gearings, levers and links but no fragile element such as a galvanometer so that troubles can be considerably eliminated according to this system. Furthermore, owing to the transistor circuit capable of producing a considerably large torque on the motor, the mechanical portions can be smoothly actuated and the determined brightness value automatically indicated with a very simple operation.

The electric circuitry of the exposure meter is so adapted as to produce no fluctuation or oscillation in the indicated value until reaching equilibrium when the brightness of a photographic object is varied. Furthermore, the exposure meter can provide automatic exposure control and indication of the brightness of the photographic object substantially at the same speed as that of its response. In this respect, the output signal from the bridge circuit is amplified so as to drive the motor which rotates the variable resistor to vary the resistance thereof, and when the ratio of the resistance $R_1$ of the photoelectric element to the resistance $r_1$ of the variable resistor comes to a predetermined value, the motor is stopped and the angular deviation of the variable resistor indicates the brightness value in question.

The regulation of the automatic exposure means and indication of the brightness can be carried out for a considerably large change in the brightness of the photographic object by means of the aforementioned switching member.

The foregoing and other objects and advantages will appear from the following description of the preferred embodiment of the invention that is shown in the accompanying drawings, in which:

FIG. 1 is schematic side view of an optical system usable in an exposure meter according to the invention;

FIG. 2 is a rear view of the same;

FIG. 3 is a side view illustrating another embodiment of the invention;

FIG. 4 is a circuit diagram of a conventional detecting system;

FIG. 5 is a circuit diagram of an embodiment of a detecting system according to the invention;

Figure 6:
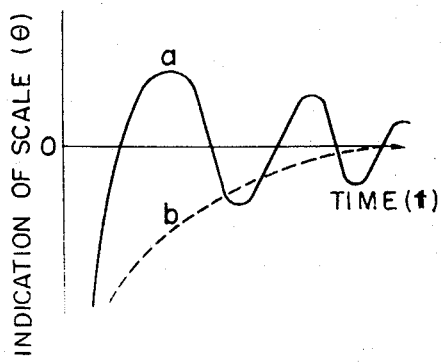
FIG. 6 is a graph illustrating the response of a conventional detecting circuit to a change in its input signal, shown as variation of its output from the moment of occurrence of such change until an equilibrium is reached.

Referring to FIG. 1, a plane or spherical reflective mirror 2 is disposed in axial alignment with an achromatic objective lens 1, which comprises either a single lens element or a pair of concave and convex lens elements spaced from mirror 2 at a distance less than the focal length of the composite of lens 1 and mirror, and a window 3 is placed in the path of reflected light beams from the mirror 2 so as to pass therethrough only those image forming light beams within a desired narrow angle corresponding solely to a major portion of a photographic object. The light beams are projected onto a photo-electric element 4 through the window 3 and detected thereby. Furthermore, a portion of the light beams passing through the objective lens 1 at the central portion thereof, which portion of the light beams is to be interrupted by the photo-electric element 4, is deflected by a slanting plane mirror 5 disposed between the objective lens 1 and the photo-electric element 4 toward an erect prism 6, such as a poloprism or a pentaprism, to form a branch light path. Since there is formed a large real image conjugate with the major portion of the photographic object at an intermediate point between the erect prism 6 and the eye lens 7, a graduated plate 8 having marked graduations or indices is positioned at the intermediate position.

FIG. 3 shows another arrangement of the optical system, which comprises an objective lens 1 and a plane mirror 9 placed on the axial line of the objective lens 1 with a spacing therebetween smaller than the focal length of the objective lens 1, so that a reversed conjugate image can be formed outside the light path of the incident light to the lens 1. In addition, a window 10 and a photo-electric element 11 are positioned on a light path deflected by the mirror 9 in the same manner as the aforementioned corresponding window 3 and photo-electric element 4, and thereby light beams are projected onto the element 11.

The photo-electric element in a detecting circuit of FIG. 4 acts to receive the light beam delivered thereto by means of an optical system, such as those shown in FIGS. 1 and 3, and an output is produced with a time delay to represent the brightness of the photographic object and variation of the brightness.

Such output signal is used to keep the intensity of the light beam at the photo-electric element at a constant level by controlling an aperture in front of the photo-electric element by a suitable means, such as an ammeter. With a conventional detecting circuit, such output signal is delivered to the ammeter with a delay, and accordingly, the aperture is overcontrolled or overreached and then it is returned toward a certain equilibrium position but again a little excessively in a oscillatory manner until it reaches the certain equilibrium position, as illustrated by curve $a$ in FIG. 6. If the response of feedback system is delayed for the purpose of eliminating such oscillation, then the time necessary for reaching the equilibrium position is also delayed, as shown by curve $b$ of FIG. 6.

FIG. 5 shows a circuit to eliminate such difficulty, in which $R_1$ is a photo-electric element, $r_1$ a variable resistor driven by a motor M, and D a voltage compensating element for variation in a power source voltage of the circuit.

It is assumed that when the ratio of the resistance value of $R_1$ to that of $r_1$ is at a certain level, the voltage across $r_1$ is $V_1$ and $V_2=V_3$ (see FIG. 5). If it further assumed that if the resistance value of $R_1$ is changed to $R_1'$ due to variation in the intensity of the light beam, then the arrangement of the circuitry is such that the condition of $V_2=V_3$ is lost to rotate the motor M so as to modify the resistance value of $r_1$ until the condition of $R_1/r_1=R_1'/r_1'$, at which time the condition of $V_2=V_3$ is also resumed. By reading the position of an indicator gang-operated together with the variable resistor $r_1$ or graduations associated therewith, the intensity of the incident light can be determined. Besides, the delay of the response of $V_2$ and $V_3$ with respect to a variation in $V_1$ is completely negligible.

Figure 7:
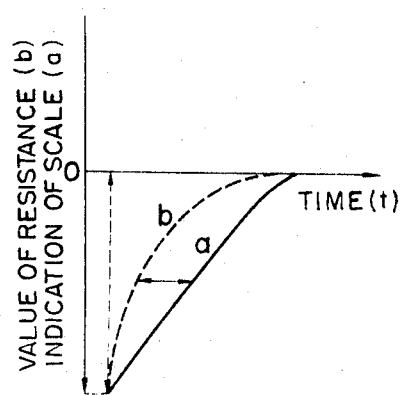
FIG. 7 is a graph illustrating both the response of a detecting circuit according to the present invention to a change in its input signal, shown as variation of its output from occurrence of such change until an equilibrium is reached, and the response of a photo-electric element to a change in the incident light thereto.

The resistance value of the element $R_1$ is varied, for instance, as shown by curve $b$ of FIG. 7, responsive to a certain change in the intensity of the incident light beam thereto, while the corresponding change in resistance value of the resistor $r_1$ is somewhat delayed due to the inertia of the motor M, as shown by curve $a$ of the figure, until it reaches an equilibrium point. As soon as the equilibrium point is reached, the motor M is stopped immediately, and there is no possibility of overshooting and oscillation. Moreover, the overall response speed can be made as fast as that of the photo-electric element response by increasing the response speed of the motor M.

FIGS. 8 to 11 show an embodiment of the invention, in which a proper exposure is automatically indicated in the view finder thereof by utilizing the optical system and detecting circuit described hereinbefore referring to FIGS. 1 to 7. In an indication portion shown in FIG. 8, two transparent plates 12 and 13 (corresponding to the graduated plate 8 of FIG. 1) are rotatably mounted on a view finder cylinder. The transparent plate 12 has film speed, such as the ASA speed, setting graduations formed on the outer periphery thereof and aperture setting graduations formed on the inner periphery thereof. A mask plate 14 is so disposed in front of the plate 12 as to shield the film speed setting graduations on the latter plate except for those visible through a window portion 15 thereof. A frame 16 of the transparent plate 12 is engaged with a gear 18 secured to a film speed setting shaft 17, and upon rotation of the film speed setting shaft 17 either manually or any other suitable means, the transparent plate 12 is also rotated.

The other transparent plate 13 has exposure time setting graduations formed along the periphery thereof so as to correspond with the aperture setting graduations of the plate 12. A frame 19 of the transparent plate 13 is engaged with a gear 20 secured to the shaft 22 of a motor 21, so as to rotate the plate 13 responsive to the rotation of the motor 21. An index 23 acts to point out aperture graduations on the plate 12 and exposure time graduations on the plate 13, which graduations are illuminated by means of a lamp in an illuminating window 24.

Figure 9:
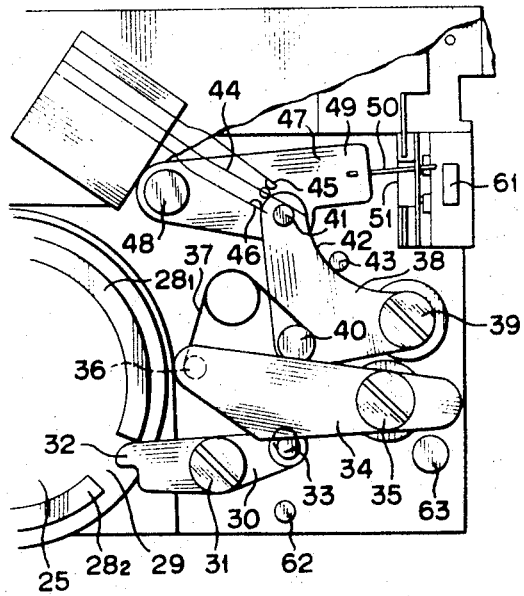
FIG. 9 is an elevation view of a mechanism for automatically switching the brightness measuring system from higher brightness to lower brightness or vice versa by a snap action.
Figure 8:
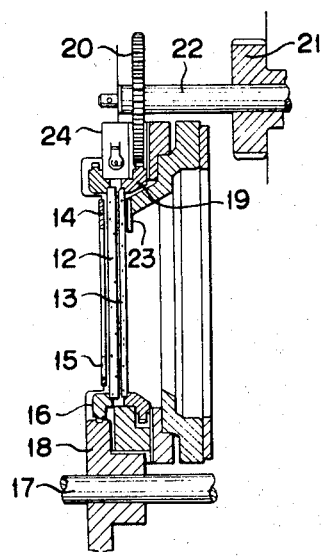
FIG. 8 is a sectional view of a mechanism for indicating the value of brightness determined.

In FIG. 9, a variable resistor holder 25 to be driven by the motor 21 is provided with two resistors 26, 27 together with projecting cams 281 and 282. An end 32 of a first lever 30 pivotally supported by a shaft 31 secured to the framework of the exposure meter is received by a notch 29 of the projecting cams 281 and 282, while the opposite end of the first lever is provided with a pin 33 secured thereto. A side edge of a second lever 34 pivotally supported by a shaft 35 is biased so as to be urged against the pin 33 in a counterclockwise direction. One end of a coiled spring 37 is wound around the pin 37 on the second lever, while the opposite end of the spring 37 is in turn wound around a pin 40 on an L-shaped switching lever 38 pivotally supported by a shaft 39. The pin 40 is positioned at a dead point slightly above a line extending between the pin 36 of the aforementioned second lever 34 and the shaft 39 of the switching lever 38 as long as the lever 38 is at the position shown in FIG. 9.

Figure 10:
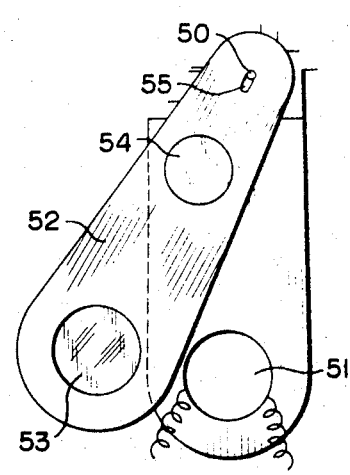
FIG. 10 is an elevation view of a mechanism for moving the control member for the light impinging into the photoelectric element out of or into the switching mechanism.

Under the conditions as shown in FIG. 9, a pin 43 on the framework of the exposure meter is engaged with an arcuate surface 42 of the switching lever 38 formed along the opposite edge thereof with respect to the pin 40. The movable contact 44 of a turn-over switch having a pair of stationary contacts 45 and 46, which is biased toward the stationary contact 46, is under these conditions urged against a pin 41 of the switching lever 38 so as to be in contact with the stationary contact 45. A light beam switching lever 47, pivotally supported by a shaft 48, is engaged with the pin 41, and a connecting rod 50 is secured to a tip end 49 of the lever 47. In FIG. 10, the opposite end of the connecting rod 50 is fitted in a long slot 55 in a light beam switching frame 52 pivotally supported by a shaft 54. The switching frame 52 is provided with a filter 53, which acts as a light beam limiting member for covering a window 51 (corresponding to the window 3 of FIG. 1 and the window 10 of FIG. 3) for a photo-electric element 61 (FIG. 11).

Figure 11:
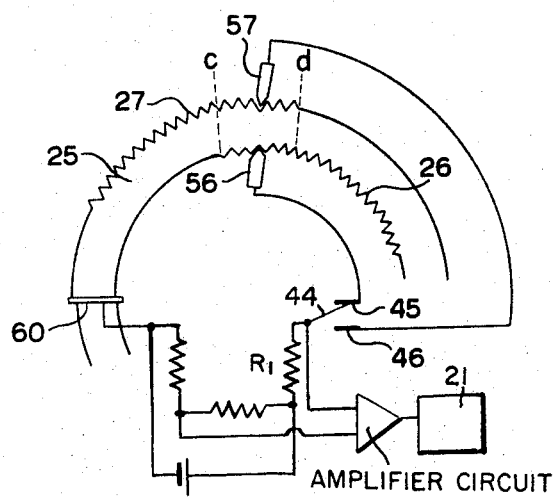
FIG. 11 shows an embodiment of the variable resistor $r_1$ appearing in FIG. 5.

Referring to FIG. 11, the resistors 26 and 27 of the variable resistor have small portions thereof held by a common arcuate portion c–d of the variable resistor holder 25, and the remainders thereof are extended in opposite directions each other along the arcuate projecting cams of the holder 25. At about the middle of an arcuate span covering the two variable resistors, there are affixed brushes 56 and 57, which are respectively in contact with the variable resistors 26 and 27. The brush 56 is connected to the stationary contact 45, while the other brush 57 is connected to stationary contact 46. The motor 21 and a battery 58 are connected in series between the movable contact 44 and a brush 60 feeding both variable resistors 26, 27.

Bosses 62 and 63 (FIG. 9) serve to control the rotation of the first lever 30 and the second lever 34, respectively.

In operation of the exposure meter the construction described in the foregoing, the transparent plate 12 is rotated by turning the film speed setting shaft 17 until the speed, such as the ASA speed, of the film being used is indicated in the window 15 of the mask plate 14. Then, upon facing the exposure meter toward a photographic object, the light beams from the object pass through the optical system described hereinbefore, by way of the objective lens, the view finder, the window 51, and the photoelectric element 61, and thereby an electric current flows through the photo-electric element to rotate the motor 21 by means of the control circuit, as shown in FIG. 5. For instance, the variable resistor holder 25 is rotated in a clockwise direction by the motor 21 to cause sliding of the variable resistor 26 while keeping contact with the brush 56, thereby the apparent resistance of the variable resistor is reduced to vary the magnitude of a current flowing through the resistor 26, the brush 56, the contacts 45, 44, the battery 58, the motor 21, and back to the resistor 26. When the ratio of $R_1$ to $r_1$ reaches a predetermined constant value, the motor 21 is stopped. Thus, the index 23 indicates a proper exposure time on the transparent plate 13 corresponding to a lens aperture shown on the transparent plate 12.

In the condition of FIG. 9, when the resistor holder 25 is rotated further in a clockwise direction, the first lever 30 is to be rotated in a counterclockwise direction owing to the protruded cam 281 so as to rotate the second lever 34 in a clockwise direction of which pin 36 will pass over the line connecting the center of the shaft 39 of the switching lever 38 with that of the pin 40. Thus the switching lever 38 is rotated about 39 in a counterclockwise direction owing to the force of the spring 37.

As a result of this change-over of the switching lever, the filter 53 will cover the window 51.

The switching lever 38 is stopped to abut the stud of the shaft 35 in a position where the spring 37 urges the second lever 34 in a counterclockwise direction. Said urging will cause rotation of the resistor holder 25 in a counterclockwise direction. When the first lever 30 is disengaged from the cam 281, the second lever 34 will rotate in a counterclockwise direction to pass over the dead point whereby the switching lever 38 occupies its initial position.

When the brightness of the photographic object is greater than a certain predetermined value, the rotation of the variable resistor holder 25 is also increased in excess of the aforementioned predetermined amount to rotate the first lever 30 in a counter-clockwise direction and the second lever 34 in a clockwise direction by angles large enough to cause the line connecting the pin 36 of the second lever 34 and the shaft 39 of the switching lever 36 to move to the opposite side of the pin 40. Thus, the pin 40 is moved across the line joining pin 36 and shaft 39 and is pushed downwards rapidly by the energy stored in the coiled spring 37. Accordingly, the switching lever 38 is rotated in a counter-clockwise direction by a snap action to shift the movable contact 44 from the stationary contact 45 to the other stationary contact 46 instantaneously. Thereafter, a circuit comprising the variable resistor 27, the brush 57, the contacts 46, 44, and the battery 58 is connected to the motor 21, and the current through the motor is varied in accordance with resistance variation of the variable resistor 27. At the same time, the light beam switching lever 37 is also rotated rapidly by the aforementioned snap action rotation of the switching lever 38 to turn the light beam switching frame 52, and accordingly the filter 53 acting as a light beam limiting member acts to cover the window 51 for the photoelectric element 61. Thus, the incident light to the photoelectric element 61 is limited by the filter 53, and the motor 21 is rotated until the time when the magnitude of the current flowing through the photo-electric element 61, due to the above limited incident light beam, becomes the same as that of the current flowing through the aforementioned circuit including the variable resistor 27, and then the motor 21 stops to indicate the proper exposure for the brightness of the photographic object. This exposure is shown in the view finder by means of the transparent plates 12 and 13 in conjunction with the index 23.

In the preceding description, the switching response for the brightness shift from a low brightness to a high brightness is explained. In the case of a switching response for a brightness change from a high brightness to a low brightness, the motor 21 is rotated in the opposite direction to rotate the variable resistor holder 25 in a counter-clockwise direction, and the projecting cam 282 of the holder 25 allows the clockwise rotation of the first lever 30. Accordingly, the succeeding rotation of the second lever 34 results in the transfer of the line between the pin 36 and the shaft 39 to the lower side of the pin 40, and consequently, the pin 40 is returned across such line to rotate in snap action of the switching lever 38 in a clockwise direction. At the same time, the movable contact 44 is shifted to the stationary contact 45 to switch over the variable resistor 27 with the variable resistor 26, and the filter 53 is removed from the window 51 for the photoelectric element 61.

In order to prevent occurrence of repeated oscillatory switching operations, at the time of switching, due to minor variation of brightness of the photographic object and the time constant of the photo-electric element, small portions of the variable resistors 26 and 27 are disposed in a overlapping manner at a common c–d section of the arcuate holding portion of the variable resistor holder 25, as illustrated in FIG. 11, and a space 29 (FIG. 9) is provided between the projected cams 281 and 282.

In the embodiment described hereinbefore, an adjusted proper exposure is automatically indicated in the finder thereof. However, the invention is not restricted to such arrangement alone. For instance, it is possible to provide an automatic exposure control of a camera by directly actuating an aperture control means mounted onto a cylinder holding an objective lens or a shutter speed regulating means by utilizing the rotation of the variable resistors responsive to the rotation of the motor.

Furthermore, it is also possible to add the range of reproducible zone of a typical film to graduations and indices of the transparent plate to facilitate determination of the proper exposure while considering such range.

What we claim is:

1. A monocular narrow angle exposure meter comprising an objective lens, a finder optical system, a light measuring optical system including a photo-electric element, means for directing a central portion of incoming light rays from the objective lens to the finder optical system and a remaining peripheral portion to the light measuring optical system, a window for restricting the light receiving angle located in an image-forming plane of the light measuring optical system, said photo-electric element being located just behind said window, scale means and indicator means arranged in the image-forming plane of the finder optical system, a variable resistor, circuit means for detecting the ratio of the resistance of the photo-electric element to that of the variable resistor, means for automatically varying the resistance of the variable resistor so that said ratio is at a predetermined value, and means for mechanically connecting said variable resistor with said indicator means to inidcate the value determined on said scale means.

2. A monocular narrow angle exposure meter according to claim 1 wherein said light measuring optical system further includes a reflective mirror placed on the optical axis of said objective lens at a spacing therefrom less than the focal length of the objective lens, said finder optical system further including an erect prism, an eye lens and a small slanting mirror placed on the optical axis of the objective lens so as to pass light beams to an erect prims, and an eye lens.

3. A monocular narrow angle exposure meter according to claim 1 wherein said varying means includes a motor connected to vary the resistance value of said variable resistor in response to rotation of the motor.

4. A monocular narrow angle exposure meter according to claim 3 comprising sensitivity selecting means for said photo-electric element, said variable resistor comprising a pair of resistors connected in series with said photo-electric element, a switching member operative by snap action, an exposure regulating member, means coupled with said exposure regulating member and said indicating means to correlate operation thereof, switch means for said motor for operation thereof in correlation with said sensitivity selecting means, said switching member being connected to said indicator means, said photo-electric element and said switch means to carry out both selective connection of said variable resistors with said photo-electric element and simultaneous selection of said switch means, and an incident light beam limiting member adapted to be switched by said switching member in conjunction with the sensitivity selecting means.

References Cited

UNITED STATES PATENTS

| | | | |
|---|---|---|---|
| 2,755,704 | 7/1956 | Gilbert | 95—10 |
| 3,093,044 | 6/1963 | Lederer | 95—42 |
| 3,272,105 | 9/1966 | Manderfeld | 95—42 |
| 3,298,773 | 1/1967 | Auracher | 95—102 |
| 3,332,330 | 7/1967 | Broschke et al. | 95—42 |
| 3,357,779 | 12/1967 | Suieussaar | 95—102 |

NORTON ANSHER, Primary Examiner

R. L. MOSES, Assistant Examiner

U.S. Cl. X.R.

95—10